Sept. 26, 1967 A. G. V. GUSTAFSSON 3,343,832
SPRING SUSPENSION DEVICE
Filed Sept. 30, 1965
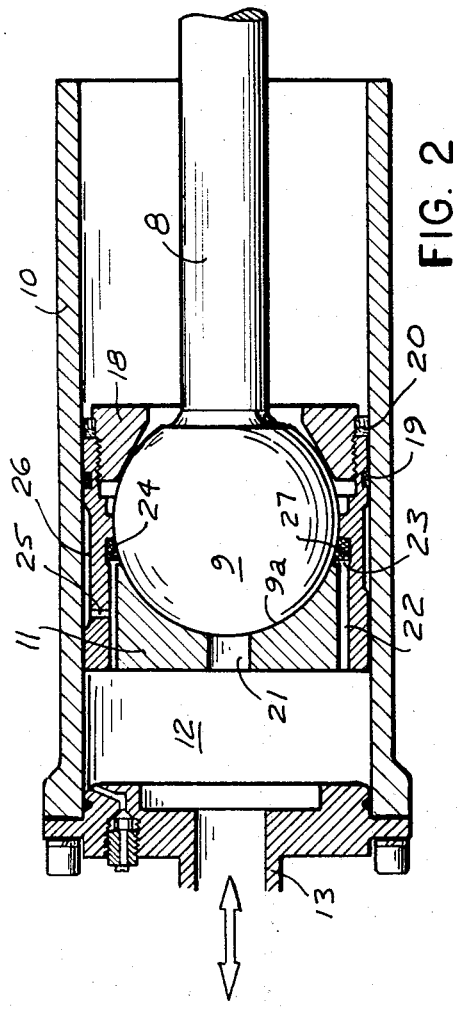
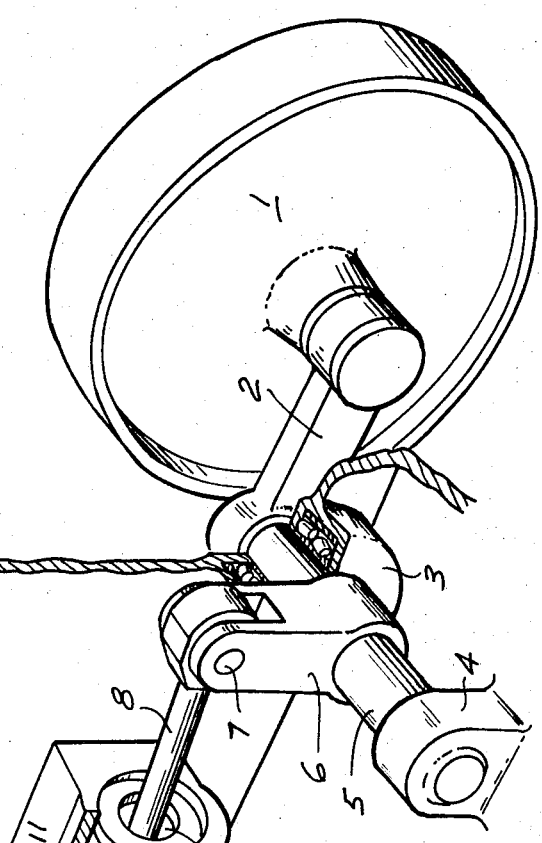
INVENTOR
AXEL GERHARD VÄRNE GUSTAFSSON
BY Hume and Nydick
ATTORNEYS

United States Patent Office 3,343,832
Patented Sept. 26, 1967

3,343,832
SPRING SUSPENSION DEVICE
Axel Gerhard Värne Gustafsson, Karlskoga, Sweden, assignor to Aktiebolaget Bofors, Bofors, Sweden, a corporation of Sweden
Filed Sept. 30, 1965, Ser. No. 491,655
Claims priority, application Sweden, Nov. 4, 1964, 13,252/64
8 Claims. (Cl. 267—64)

The present invention relates to a spring suspension device for absorbing shocks experienced by a running wheel of a vehicle. The invention is especially suitable for use with driving and other wheels of a track-laying vehicle, such as an armored tank or a personnel carrier.

More particularly, the invention relates to a spring suspension device of the kind in which the shocks to be absorbed are transmitted by a linkage to a piston slidable in a hydraulic cylinder. If shocks to be absorbed occur, the piston, which is suitably sealed against the cylinder wall, is displaced by the linkage against the counter pressure of hydraulic fluid in the cylinder, and such displacement is utilized to absorb the shocks.

Practical experience has shown that it is difficult to transmit the movement of the linkage to the piston without causing considerable wear and tear on the involved structural components of the spring suspension device.

It is an object of the invention to provide a novel and improved spring suspension device of the kind above referred to which is capable of absorbing shocks without undue wear and tear on structural components of the spring suspension device.

Another object of the invention is to provide a novel and improved spring suspension device of the general kind above referred to which is self-lubricating and requires only comparatively few and rugged components.

The afore-pointed-out objects, features and advantages and other objects, features and advantages which will be pointed out hereinafter are attained by providing a spring suspension device comprising a first hydraulic cylinder open at one end and closed at the other end, a piston slidable in said cylinder and including in its side facing the open cylinder end an open, generally spherical cavity, and a piston rod mounting at one end a ball rotatably fitted into said cavity to form a pivot joint. Shocks to be absorbed are transmitted to the rod by shock-transmitting means. The cylinder space adjacent to the side of the piston opposite to the one including the cavity is filled with hydraulic fluid and connected by a duct to the space in said cavity between the respective piston wall portion and the adjacent outer wall surface of the ball to form a lubricating fluid film in said space.

The piston wall portion defining the spherical cavity preferably includes a peripheral groove in which a sealing ring is fitted to block a flow of hydraulic fluid to the open side of the cavity and thus into the cylinder. A reinforcing ring, made, for instance, of a suitable plastic, may be fitted in the groove on the side of the sealing ring facing the open end of the cylinder to prevent damage to the sealing ring. This groove may be connected by one or several ducts to a groove in the peripheral outer wall of the piston. This outer groove forms a reservoir for a lubricant, such as the aforementioned hydraulic fluid, to effect lubrication between the piston and the cylinder.

In the accompanying drawing, an embodiment of the invention is shown by way of illustration, and not by way of limitation.

In the drawing:

FIG. 1 is a perspective view, partly in section, of a spring suspension device according to the invention, and FIG. 2 is a fragmentary sectional view of the device.

Referring now to the figures in detail, there is shown a wheel 1, which may be visualized as a wheel such as a driving, guiding or running wheel of a track-laying vehicle. Wheel 1 is rotatable on an arm 2, which is fixedly seated on a shaft 5 suitably supported in bearings 3 and 4. Shaft 5 mounts a fixedly secured crank arm 6, to which is linked one end of a piston rod 8 pivotal about a pivot pin 7. The other end of rod 8 mounts a ball 9, which is received in a generally spherical cavity 9a formed in a piston 11, as will be more fully described hereinafter.

The piston is slidable in a cylinder 10 closed at one end and open at the other end to provide access for rod 8 and ball 9 thereto. The cylinder space 12 formed between the closed end of the cylinder and the respective, preferably flat face of piston 11 is filled with a suitable hydraulic fluid, such as oil. The closed cylinder space is connected by a conduit 13 to a cylinder space 14 in a second hydraulic cylinder 15. A piston 16 is freely floating in cylinder 15 and suitably sealed against the cylinder wall, for instance, by piston rings. The cylinder space 17 formed between the respective side of piston 16 and the respective end wall of cylinder 15 is also filled with a suitable medium, such as a pressurized gas—for instance, nitrogen.

Turning now to FIG. 2, this figure shows that ball 9 is retained in cavity 9a formed in piston 11 by a mounting ring 18 threaded into the respective end face of the piston. The piston is suitably sealed against the inner peripheral wall of cylinder 10, for instance, by an O-ring 19 and a piston ring 20 of the kind known as a Simmer ring. The side of the piston facing the closed cylinder space 12 is connected by a duct 21 to the cavity. Furthermore, one or several ducts 22 lead from space 12 to a peripheral groove 23 formed in the piston wall, preferably transversely of the longitudinal axis of cylinder 10. In this groove 23 a sealing ring 24, such as an O-ring, is fitted. This ring is reinforced by a ring 27 also fitted in the groove, on the side of ring 24 facing the open end of the cylinder. Reinforcing ring 27 may be made of a suitable plastic, such as a plastic known under the trademark Teflon. Duct 22 is connected by one or several radial bores 25 to a peripheral groove 26 in the outer peripheral wall of the piston.

The spring suspension device as hereinbefore described operates as follows:

Let it be assumed that the wheel 1 is subjected to a shock tending to move the wheel upwardly, as seen in FIG. 1. As a result of such shock, arm 2 is correspondingly turned in counterclockwise direction, thereby causing a displacement of rod 8, forcing piston 11 deeper into cylinder 10. Accordingly, some of the oil in cylinder space 12 is forced through conduit 13 into space 14 of cylinder 15. Consequently, the gas in cylinder space 17 is correspondingly compressed, thereby exerting an increased counter pressure upon piston 16 and thus upon the oil in cylinder space 12. The oil pressure in cylinder space 12 is transmitted through duct 21 to the space between ball 9 and the corresponding inner wall portion of piston 11, so that a lubricating oil film is formed and maintained in this space. Furthermore, the sealing ring 24 is pressed against ball 9 so that the oil-containing space of cylinder 10 is reliably and tightly sealed against the open space of the cylinder, even though the piston rod 8 is subjected to repeated and oppositely acting shocks.

Reinforcement ring 27 prevents a jamming of sealing ring 24 between the ball and the piston wall. The outer peripheral surface of piston 11 is lubricated by oil supplied to groove 23 through duct or ducts 22 and bore or bores 25, which connect the oil supply in space 12 with groove 26.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A spring suspension device comprising, in combination, a first hydraulic cylinder open at one end and closed at the other end, a piston slidable in said cylinder and including in its side facing the open cylinder end an open, generally spherical cavity, a piston rod, a ball on one end of said piston rod, said ball being rotatably fitted in said cavity to form a pivot joint, and shock-transmitting means linked to the other end of said rod, the other side of said piston including a duct leading from said other side into the space defined in said cavity between a piston wall portion bounding said cavity and an adjacent surface portion of the ball in the cavity, said cylinder including a closed space bounded by said other side of the piston and the closed cylinder end, said closed cylinder space being filled with a hydraulic fluid, a second hydraulic cylinder closed at both ends, a piston freely floating in said second cylinder, said second cylinder being filled on one side of said free piston with a hydraulic fluid, and a conduit connecting the portion of the second cylinder on the filled side of the piston therein with said closed space of the first cylinder.

2. A spring suspension device according to claim 1, wherein said other side of the piston has a substantially plane surface.

3. A spring suspension device according to claim 1, wherein the piston wall portion bounding said spherical cavity includes a peripheral groove and a sealing ring is fitted in said groove, said sealing ring blocking a flow of hydraulic fluid to the open side of said cavity.

4. A spring suspension device according to claim 3, wherein said peripheral groove is disposed transversely of the lengthwise axis of said cylinder.

5. A spring suspension device according to claim 3, wherein a reinforcing ring is fitted into said groove on the side of the sealing ring therein facing the open end of the cylinder.

6. A spring suspension device according to claim 5, wherein said reinforcing ring is a ring made of a plastic.

7. A spring suspension device according to claim 3, wherein said piston in the first cylinder includes at least one further duct leading from said other side of the piston to said groove.

8. A spring suspension device according to claim 7, wherein the outer peripheral wall of the piston includes a peripheral groove connected with said further duct.

No references cited.

ARTHUR L. LA POINT, *Primary Examiner.*

R. M. WOHLFARTH, *Assistant Examiner.*